Patented Oct. 31, 1950

2,527,856

UNITED STATES PATENT OFFICE 2,527,856

HOT MELT COMPOSITIONS

George R. Sido, Wilbraham, and John F. Murphy, Springfield, Mass., assignors to Monsanto Chemical Company, St. Louis, Mo., a corporation of Delaware No Drawing. Application July 14, 1948, Serial No. 38,754

9 Claims. (Cl. 260—27)

This invention relates to hot-melt compositions. More particularly, the invention relates to hot-melt compositions based on polyvinyl acetal resins.

Hot-melt compositions are among the relatively recent developments in the coating, impregnating and adhesive fields. Originally based on waxes and later on resinous materials, they present many advantages over prior coating, impregnating and adhesive compositions. They have, however, been deficient in adhesiveness and age-resistance to such an extent that their use has been limited.

One object of this invention is to provide improved hot-melt compositions.

Another object is to modify polyvinyl acetal hot-melt compositions to increase their adhesiveness and their resistance to aging.

These and other objects are attained by incorporating ethers of aldylol-aryl sulfonamides in hot-melt compositions based on polyvinyl acetal resins.

The following examples are given in illustration and are not intended to limit the scope of this invention. Where parts are mentioned, they are parts by weight.

Example I

| | Parts |
|---|---|
| Polyvinyl butyral | 100 |
| Hydrogenated castor oil | 260 |
| Esterified polymerized rosin | 360 |
| Dioctyl phthalate | 27 |
| Methyl ether of p-toluene sulfonamide-formaldehyde condensation product | 27 |

The polyvinyl butyral used contained about 10% to about 12% hydroxyl groups by weight calculated as polyvinyl alcohol, from about 0.5 to about 2% acetate groups calculated as polyvinyl acetate and the balance was butyraldehyde acetal groups.

All ingredients were loaded into a double-bladed dough-type mixing machine and mixed at a temperature of about 145° C. until a completely homogeneous mass was obtained. The resulting composition was fluid at about 105° C. to 175° C. At these temperatures it could be coated on glass, metal, fabrics, paper, wood, etc., to obtain coatings having a high gloss which were water-resistant, age-resistant and which showed exceptionally high adhesion to the surfaces to which they were applied. If desired, the coated surfaces could be heat-sealed to other similar or dissimilar surfaces at temperatures ranging from about 60° C. to about 200° C. using a small amount of pressure.

Example II

| | Parts |
|---|---|
| Polyvinyl butyral | 100 |
| Hydrogenated castor oil | 285 |
| Esterified polymerized rosin | 250 |
| Dioctyl phthalate | 22 |
| Propyl ether of p-toluene sulfonamide-formaldehyde condensation product | 36 |

The same polyvinyl butyral as that shown in Example I was used. The ingredients were mixed together at about 140–150° C. until homogeneous. The product was fluid at from 105–175° C. at which temperatures it could be used as a coating or impregnating composition. On cooling to room temperature, it was tough, water-resistant and adherent to glass, metal, fabrics, wood, etc.

Example III

| | Parts |
|---|---|
| Polyvinyl butyral | 100 |
| Hydrogenated castor oil | 332 |
| Esterified polymerized rosin | 166 |
| Esterified hydrogenated rosin | 125 |
| Octyl ether of p-toluene sulfonamide-formaldehyde condensation product | 66 |

The polyvinyl butyral was taken from the same batch as that of Example I. The ingredients were mixed at 140–150° C. until homogeneous. The resulting composition was fluid at 105–175° C. at which temperature it could be used as a coating and impregnating composition.

The hot-melt composition comprises hydrogenated castor oil, a polyvinyl acetal resin, a natural resin, or derivative thereof, and a plasticizer. The compositions have excellent adhesive qualities towards a variety of surfaces such as paper, textiles, cellophane, cellulose acetate, metal foils, wood, etc. They are heat-sealable with a minimum of pressure at 60-200° C. and are sufficiently low in viscosity at 105-175° C. to be easily applied.

The polyvinyl acetal resins which may be used are prepared by hydrolyzing a polyvinyl ester, either completely or partially, and reacting the hydrolyzed product with an aldehyde or ketone such as formaldehyde, acetaldehyde, butyraldehyde, valeraldehyde, octaldehyde, benzaldehyde, methyl ethyl ketone, methyl isopropyl ketone, etc., or mixtures of the same. U. S. Patent to Morrison et al., Reissue 20,430, dated June 29, 1937, illustrates suitable methods for preparing such resins. Polyvinyl acetal resins prepared in this manner have a certain number of ester groups, originally present in the polyvinyl ester, which have not been removed, as well as a certain number of hydroxyl groups which have replaced ester groups and have not been replaced with acetal groups.

According to one embodiment of this invention, the polyvinyl acetal resins employed may be considered to be made up, on a weight basis, of 5-25% hydroxyl groups, calculated as polyvinyl alcohol, 0-40% ester groups, calculated as polyvinyl acetate, and the balance substantially acetal. In a preferred embodiment of this invention, the range of hydroxyl groups is restricted to 5-18%.

When the acetal is butyraldehyde acetal, according to one embodiment of this invention, the polyvinyl acetal resin contains, on a weight basis, 5-18% hydroxyl groups calculated as polyvinyl alcohol, 0-30% acetate groups calculated as polyvinyl acetate, and the balance substantially butyraldehyde acetal.

When the acetal is formaldehyde acetal, according to another embodiment of this invention, the polyvinyl acetal resin may contain, on a weight basis, 5-8% hydroxyl groups, calculated as polyvinyl alcohol, 10-16% acetate groups, calculated as polyvinyl acetate and the balance substantially formaldehyde acetal.

An example of a polyvinyl acetaldehyde acetal resin is one containing, on a weight basis, 7% hydroxyl groups calculated as polyvinyl alcohol, 17% acetate groups calculated as polyvinyl acetate and the balance substantially acetylaldehyde acetal. Typical of a mixed acetal resin is one which contains, on a weight basis, 13% hydroxyl groups calculated as polyvinyl alcohol, 2-6% acetate groups calculated as polyvinyl acetate and the balance acetaldehyde and butyraldehyde acetal groups in a molar ratio of 65-50% acetaldehyde and 35-50% butyraldehyde acetal groups.

If 100 parts of polyvinyl acetal resin are taken as the base of the hot-melt adhesive of this invention, the amount of hydrogenated castor oil used may vary from about 200 to about 800 parts. It may be replaced in part by other materials, such as synthetic and natural waxes which are compatible, partially compatible, or compatible with polyvinyl acetal resin in the melt only at application temperature. The hydrogenated castor oil should be present in an amount by weight at least equal to that of the material replacing it in part.

Hydrogenated castor oil is a waxy solid obtained by the complete hydrogenation of castor oil and is principally 12-hydroxy glyceryl trihydroxy stearate. It has an apparent specific gravity of 0.98-0.90 at 20° C., a melting or solidification range of 86-88° C., an acid number less than 2.0, a saponification number ranging from 175-185, an iodine number ranging from 2.5-8.5, a hydroxyl number ranging from 135-165 and an ash content of less than 0.005%.

The esters of hydrogenated or polymerized rosin shown in the example may be replaced in whole or in part by natural or synthetic resins and derivatives thereof, including dammar, elemi, copal, kauri, chlorinated diphenyls, chlorinated terphenyls, chlorinated naphthalenes, pentaerythritol resins, etc. The amount of resin to be used may vary from about 100 to about 800 parts per 100 parts of polyvinyl acetal resin.

The plasticizer, dioctyl phthalate, may be replaced in whole or in part by other plasticizers for polyvinyl acetal resins. For example, one or more of the following may be used: esters of phthalic acid, sebacic acid, ricinoleic acid, lauric acid, phosphoric acid, triethylene glycol dihexoate, triethylene glycol di-2-ethyl hexoate, methyl phthalyl ethyl glycollate, ethyl phthalyl ethyl glycollate, butyl phthalyl butyl glycollate, etc. The amount of plasticizer used may vary from about 20 to about 200 parts per 100 parts of polyvinyl acetal resin.

The hot-melt compositions may be made by heating one or more, or all of the ingredients to about 135-150° C., and then adding the remaining ingredients, if any, with constant agitation.

The ethers of aldylol-aryl sulfonamides are new compounds which are disclosed and claimed in the copending application of G. R. Sido, Ser. No. 776,627, filed September 27, 1947. They are prepared by condensing benzene sulfonamide, or a ring-substituted benzene sulfonamide with an aldehyde under alkaline conditions and then reacting the product with an alcohol or phenol under acid conditions. The exact chemical structure of the products are not known. They are probably etherification products of a mixture of monomeric and polymeric condensation products derived by the alkaline condensation of aldehydes and the benzene sulfonamides. In order to differentiate them from ethers of purely monomeric condensation products, the compositions have been termed ethers of "aldylol" aryl sulfonamides in which the word "aldylol" connotes the condensation product of an aldehyde with the sulfonamides. The ethers of the aldylol-aryl sulfonamides are colorless to light amber materials ranging from viscous liquids to waxy solids which are relatively non-volatile and water-insoluble. When added to the hot-melt compositions, they substantially increase the adhesion of the compositions to various materials such as glass, metal, paper, cellophane, cellulose acetate foils, vinyl resin foils, wood, etc. Due to their relatively low volatility, their retention in the hot-melt composition is high over extended periods of time with the result that the compositions and coatings prepared therefrom are exceptionally resistant to aging.

The aldylol-aryl sulfonamide ethers are compatible with the ingredients of the hot-melt composition in all proportions and may be used to replace part or all of the conventional plasticizer. Thus, amounts of the sulfonamide derivatives up to about 25° by weight of the total composition may be used. In a preferred embodiment of this invention, the aldylol-aryl sulfonamide ethers comprise from about 1 to about 10% by weight of the total composition. However, it is to be understood that these ethers improve the hot-melt compositions in a number of respects other than that of plasticization.

The hot-melt compositions of this invention are solid and non-tacky at temperatures ranging from 105-175° C. They may be applied in this temperature range to the various materials enumerated above by dipping operations, roll coating, spraying, etc., the excess composition being removed by conventional means such as wiping dies, doctor blades, etc.

Pigments, fillers, dyes and other conventional additives may be added to the compositions. For ease of incorporation into the compositions, it is preferred to mix the additives with the hydrogenated castor oil and then incorporate the mixture into the compositions.

It is obvious that many variations may be made in the products and processes of this invention without departing from the spirit and scope thereof as defined by the appended claims.

What is claimed is:

1. A hot-melt composition comprising 100 parts of a polyvinyl acetal resin, from 200 to 800 parts of hydrogenated castor oil and from 1% to 25% by weight, based on the weight of the total composition, of a compound prepared by reacting a member of the group consisting of benzene sulfonamide and toluene sulfonamide, with an aldehyde under alkaline conditions and then reacting the product with an alcohol under acid conditions.

2. A hot-melt composition as in claim 1 wherein the polyvinyl acetal resin is polyvinyl butyraldehyde acetal resin.

3. A hot-melt composition as in claim 1 wherein the polyvinyl acetal resin is a polyvinyl formaldehyde acetal resin.

4. A hot-melt composition as in claim 1 wherein the polyvinyl acetal resin is a polyvinyl acetaldehyde acetal resin.

5. A hot-melt composition comprising 100 parts of a polyvinyl acetal resin, from 200 to 800 parts of hydrogenated castor oil and from 1% to 25% by weight, based on the total weight of the composition, of a compound prepared by reacting p-toluene sulfonamide with formaldehyde under alkaline conditions and then reacting the product with menthanol under acid conditions.

6. A hot-melt composition comprising 100 parts of a polyvinyl acetal resin, from 200 to 800 parts of hydrogenated castor oil and from 1% to 25% by weight, based on the total weight of the composition, of a compound prepared by reacting p-toluene sulfonamide with formaldehyde under alkaline conditions and then reacting the product with propanol under acid conditions.

7. A hot-melt composition comprising 100 parts of a polyvinyl acetal resin, from 200 to 800 parts of hydrogenated castor oil and from 1% to 25% by weight, based on the total weight of the composition, of a compound prepared by reacting p-toluene sulfonamide with formaldehyde under alkaline conditions and then reacting the product with 2-ethyl hexanol under acid conditions.

8. A hot-melt composition comprising 100 parts of a polyvinyl acetal resin, from 200 to 800 parts of hydrogenated castor oil, from 100 to 800 parts of a compound taken from the group consisting of dammar, elemi, copal, kauri, rosin, esterified hydrogenated rosin and esterified polymerized rosin, and from 1% to 25% by weight, based on the total weight of the composition, of a compound prepared by reacting a member of the group consisting of benzene sulfonamide and toluene sulfonamide with an aldehyde under alkaline conditions and then reacting the product with an alcohol under acid conditions.

9. A hot-melt composition comprising 100 parts of polyvinyl acetal resin, from 200 to 800 parts of hydrogenated castor oil, from 100 to 800 parts of a compound taken from the group consisting of dammar, elemi, copal, kauri, rosin, esterified hydrogenated rosin and esterified polymerized rosin, from 20 to 200 parts of a plasticizer for the polyvinyl acetal resin and from 1% to 25% by weight, based on the total weight of the composition, of a compound prepared by reacting a member of the group consisting of benzene sulfonamide and toluene sulfonamide with an aldehyde under alkaline conditions and then reacting the product with an alcohol under acid conditions.

GEORGE R. SIDO.
JOHN F. MURPHY.

REFERENCES CITED

The following references are of record in the file of this patent:

UNITED STATES PATENTS

| Number | Name | Date |
|---|---|---|
| 2,331,376 | D'Alelio | Oct. 12, 1943 |